(12) United States Patent
Gupta et al.

(10) Patent No.: US 11,609,924 B2
(45) Date of Patent: Mar. 21, 2023

(54) DATABASE QUERY EXECUTION ON MULTIPLE DATABASES

(71) Applicant: Citrix Systems, Inc., Ft. Lauderdale, FL (US)

(72) Inventors: R V Shouri Gupta, Bangalore (IN); Subramanian Ramamurti, Bangalore (IN); Amit Kumar Meena, Bangalore (IN); Kunal Naithani, Bangalore (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 16 days.

(21) Appl. No.: 17/230,255

(22) Filed: Apr. 14, 2021

(65) Prior Publication Data

US 2022/0335044 A1 Oct. 20, 2022

(51) Int. Cl.
*G06F 16/2458* (2019.01)
*G06F 16/901* (2019.01)
*G06F 16/242* (2019.01)

(52) U.S. Cl.
CPC ........ *G06F 16/2471* (2019.01); *G06F 16/244* (2019.01); *G06F 16/9024* (2019.01)

(58) Field of Classification Search
CPC . G06F 16/2471; G06F 16/244; G06F 16/9024
See application file for complete search history.

(56) References Cited

U.S. PATENT DOCUMENTS

| | | | | |
|---|---|---|---|---|
| 11,294,938 B2* | 4/2022 | Beymer | ................. | G16H 10/60 |
| 2017/0329823 A1* | 11/2017 | Attaluri | ............. | G06F 16/24542 |
| 2018/0046918 A1* | 2/2018 | Moon | .................... | G06F 21/552 |
| 2019/0251195 A1* | 8/2019 | Purcell | .............. | G06F 16/24542 |
| 2020/0379978 A1* | 12/2020 | Wright | ................ | G06F 16/2477 |
| 2020/0401593 A1* | 12/2020 | Panuganty | ............ | G06F 9/4881 |

(Continued)

FOREIGN PATENT DOCUMENTS

WO WO-2021011691 A1 * 1/2021

OTHER PUBLICATIONS

Sands-Ramshaw Loren, "Use all the Databases—Part 1", Mar. 2, 2017 (Mar. 2, 2017), XP05924862, Retreived from the Internet: URL:https://www.compose.com/articles/use-all-the-databases-part-1/ [retrieved on mAY 24, 2022] pp. 2, 4, 5-9, p. 3.

(Continued)

*Primary Examiner* — Dangelino N Gortayo

(57) ABSTRACT

A method is provided for converting a single database query into multiple database queries for multiple databases and aggregating the results of each of the queries. The method includes receiving, from a calling device, an input database query including a selection set defining an aggregation key, at least one first field to be queried in a first database, and at least one second field to be queried in a second database, generating a first database query representing a first request to retrieve the at least one first field from the first database, generating a second database query representing a second request to retrieve the at least one second field from the second database, aggregating the first response and a second response to the second database query from the first database to produce an aggregated response, and providing the aggregated response to the calling device.

17 Claims, 16 Drawing Sheets

(56) References Cited

U.S. PATENT DOCUMENTS

2022/0027379 A1* 1/2022 Unterbrunner ....... G06F 16/254

OTHER PUBLICATIONS

Sands-Ramshaw Loren, "Use all the Databases—Part 2", Mar. 15, 2017 (Mar. 15, 2017), XP05924864, Retreived from the Internet: URL:https://compose.com/articles/use-all-the-databases-part-2/ [retrieved on mAY 24, 2022] pp. 2, 4.
International Search Report for International Application No. PCT/US2022/020574 dated May 30, 2022, 4 pages.
Written Opinion of the International Searching Authority for International Application No. PCT/US2022/020574 dated May 30, 2022, 7 pages.

* cited by examiner

```
type CASUser
@dataSource(name:"GRAPH")
@java(package:"com.node.cas.self.servic
e.beans") {
  name: String
  email: String
  riskScore: Long
  riskIndicators(where:
CASRiskIndicatorsWhereInput, orderBy:
[CASRiskIndicatorsOrderByInput],
groupBy:
[CASRiskIndicatorsGroupByInput],
limit:Int): [CASRiskIndicators]
@dataSource(name:"DRUID",
source:"name", destination:"userName")
} type CASRiskIndicators
@java(package:"com.node.cas.self.servic
e.beans") {
  __time: String
  userName: String
  indicatorName: String
  product: String
  record_cnt: Long
} query {
    casuser(where: CASUserWhereInput,
orderBy: [CASUserOrderByInput],
groupBy: [CASUserGroupByInput],
limit:Int): [CASUser]
}
```

FIG. 4

```
type CASUser @dataSource(name:"GRAPH")
@java(package:"com.node.cas.self.service.beans") {
  name: String
  email: String
  riskScore: Long
  riskIndicators(where: CASRiskIndicatorsWhereInput,
orderBy: [CASRiskIndicatorsOrderByInput],
groupBy: [CASRiskIndicatorsGroupByInput], limit:Int):
[CASRiskIndicators] @dataSource(name:"DRUID", source:"name",
destination:"userName")
} type CASRiskIndicators
@java(package:"com.node.cas.self.service.beans") {
  __time: String
  userName: String
  indicatorName: String
  product: String
  record_cnt: Long
}
```

FIG. 5A

```
input CASUserWhereInput
@java(implements:"com.citrix.cas.self.service.filters.WhereClause,
com.citrix.cas.self.service.filters.HavingClause",
package:"com.citrix.cas.self.service.filters") {
  name: String
  name_not: String
  name_in: [String!]
  name_notIn: [String!]
  name_lt: String
  name_lte: String
  name_gt: String
  name_gte: String
  name_contains: String
  name_notContains: String
  name_startsWith: String
  name_notStartsWith: String
  name_endsWith: String
  name_notEndsWith: String
  email: String
  email_not: String
  email_in: [String!]
  email_notIn: [String!]
  email_lt: String
  email_lte: String
  email_gt: String
  email_gte: String
  email_contains: String
  email_notContains: String
  email_startsWith: String
  email_notStartsWith: String
  email_endsWith: String
  email_notEndsWith: String
  riskScore: Long
  riskScore_not: Long
  riskScore_in: [Long!]
  riskScore_notIn: [Long!]
  riskScore_lt: Long
  riskScore_lte: Long
  riskScore_gt: Long
  riskScore_gte: Long
  AND: [CASUserWhereInput!]
  OR: [CASUserWhereInput!]
  NOT: [CASUserWhereInput!]
}
```

FIG. 5B

```
enum CASUserOrderByInput
@java(implements:"com.citrix.cas.self.service.filters.OrderByInput",
package:"com.citrix.cas.self.service.filters") {
 name_ASC
 name_DESC
 email_ASC
 email_DESC
 riskScore_ASC
 riskScore_DESC
} enum CASUserGroupByInput
@java(implements:"com.citrix.cas.self.service.filters.GroupByInput",
package:"com.citrix.cas.self.service.filters") {
 name
 email
 riskScore
}
```

FIG. 5C

```
input CASRiskIndicatorsWhereInput
@java(implements:"com.citrix.cas.self.service.filters.WhereClause,
com.citrix.cas.self.service.filters.HavingClause",
package:"com.citrix.cas.self.service.filters") {
  __time: String
  __time_not: String
  __time_in: [String!]
  __time_notIn: [String!]
  ...
  userName: String
  userName_not: String
  userName_in: [String!]
  userName_notIn: [String!]
  ...
  indicatorName: String
  indicatorName_not: String
  indicatorName_in: [String!]
  indicatorName_notIn: [String!]
  ...
  product: String
  product_not: String
  product_in: [String!]
  product_notIn: [String!]
  ...
  AND: [CASRiskIndicatorsWhereInput!]
  OR: [CASRiskIndicatorsWhereInput!]
  NOT: [CASRiskIndicatorsWhereInput!]
}
```

FIG. 5D

```
enum CASRiskIndicatorsOrderByInput
@java(implements:"com.citrix.cas.self.service.filters.OrderByInput",
package:"com.citrix.cas.self.service.filters") {
  __time_ASC
  __time_DESC
  userName_ASC
  userName_DESC
  indicatorName_ASC
  indicatorName_DESC
  product_ASC
  product_DESC
} enum CASRiskIndicatorsGroupByInput
@java(implements:"com.citrix.cas.self.service.filters.GroupByInput",
package:"com.citrix.cas.self.service.filters") {
  __time
  userName
  indicatorName
  product
}
```

FIG. 5E

DATABASE QUERY EXECUTION ON MULTIPLE DATABASES

BACKGROUND

In certain computing environments, cloud services gather data from various sources and build reports, dashboards, and other information for consumption by end users and administrators. The data includes information on entities such as users, devices, and networks, along with information about activity such as transactions and interactions between the entities. The data received by the cloud services are stored in various types of databases, such as Druid, graph, and SQL, based on the nature of the data. For example, to store the present state of an entity, such as a user, a device associated with the entity can be stored in a graph database because this type of database is suitable for correlated data. By contrast, to store the activity of an entity over time, the data can be stored in a Druid database because this type of database is suitable for time series data. As a result, different types of data associated with a given entity can be stored in multiple databases. Thus, for a given entity, multiple database queries must be used to retrieve the data from the multiple databases.

SUMMARY

One example provides a method including receiving, from a calling device, an input database query including a selection set defining an aggregation key, at least one first field to be queried in a first database, and at least one second field to be queried in a second database, the aggregation key specifying a mapping between the at least one first field and the at least one second field; generating a first database query representing a first request to retrieve the at least one first field from the first database; generating a second database query representing a second request to retrieve the at least one second field from the second database, the second request based on the aggregation key and a first response to the first database query from the first database; aggregating the first response and a second response to the second database query from the first database to produce an aggregated response; and providing the aggregated response to the calling device. In some examples, the method includes coding the first database query in a first database query language, and coding the second database query in a second database query language. In some examples, the input database query includes a database source annotation defining the first database, the second database, and the aggregation key, wherein generating the second database query includes inserting a portion of the first response that corresponds to the aggregation key into the second database query. In some examples, the input database query includes a limit condition, and wherein the method includes generating a plurality of individual queries based on the first response from the first database according to the limit condition. In some examples, the method includes performing a union of each of the individual queries to produce the second database query. In some examples, the method includes causing the first database query to be executed against the first database and causing the second database query to be executed against the second database. In some examples, the input database query is a GraphQL query, the first database query is a graphs query, the second database query is a Druid query, and the aggregated response is a GraphQL response.

Another example provides a computer program product including one or more non-transitory machine-readable mediums having instructions encoded thereon that when executed by at least one processor cause a process to be carried out, the process including receiving, from a calling device, an input database query including a selection set defining an aggregation key, at least one first field to be queried in a first database, and at least one second field to be queried in a second database, the aggregation key specifying a mapping between the at least one first field and the at least one second field; generating a first database query representing a first request to retrieve the at least one first field from the first database; generating a second database query representing a second request to retrieve the at least one second field from the second database, the second request based on the aggregation key and a first response to the first database query from the first database; aggregating the first response and a second response to the second database query from the first database to produce an aggregated response; and providing the aggregated response to the calling device. In some examples, the process includes coding the first database query in a first database query language, and coding the second database query in a second database query language. In some examples, the input database query includes a database source annotation defining the first database, the second database, and the aggregation key, wherein generating the second database query includes inserting a portion of the first response that corresponds to the aggregation key into the second database query. In some examples, the input database query includes a limit condition, wherein the process includes generating a plurality of individual queries based on the first response from the first database according to the limit condition. In some examples, the process includes performing a union of each of the individual queries to produce the second database query. In some examples, the process includes causing the first database query to be executed against the first database and causing the second database query to be executed against the second database. In some examples, the input database query is a GraphQL query, the first database query is a graphs query, the second database query is a Druid query, and the aggregated response is a GraphQL response.

Another example provides a system comprising a storage and at least one processor operatively coupled to the storage, the at least one processor configured to execute instructions stored in the storage that when executed cause the at least one processor to carry out a process including receiving, from a calling device, an input database query including a selection set defining an aggregation key, at least one first field to be queried in a first database, and at least one second field to be queried in a second database, the aggregation key specifying a mapping between the at least one first field and the at least one second field; generating a first database query representing a first request to retrieve the at least one first field from the first database; generating a second database query representing a second request to retrieve the at least one second field from the second database, the second request based on the aggregation key and a first response to the first database query from the first database; aggregating the first response and a second response to the second database query from the first database to produce an aggregated response; and providing the aggregated response to the calling device. In some examples, the process includes coding the first database query in a first database query language, and coding the second database query in a second database query language. In some examples, the input database query includes a database source annotation defining the first database, the second database, and the aggregation key, and generating the second database query includes inserting a portion of the first response that corresponds to the aggregation key into the second database query. In some examples, the input database query includes a limit condition, and the process includes generating a plurality of individual queries based on the first response from the first database according to the limit condition, and performing a union of each of the individual queries to produce the second database query. In some examples, the process includes causing the first database query to be executed against the first database and causing the second database query to be executed against the second database. In some examples, the input database query is a GraphQL query, the first database query is a graphs query, the second database query is a Druid query, and the aggregated response is a GraphQL response.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 4 shows a GraphQL schema that corresponds to the graph database schema of FIG. 3, in accordance with an example of the present disclosure.

FIGS. 5A-E show another GraphQL schema corresponding to the schema of FIG. 3, in accordance with an example of the present disclosure.

DETAILED DESCRIPTION

Figure 1:
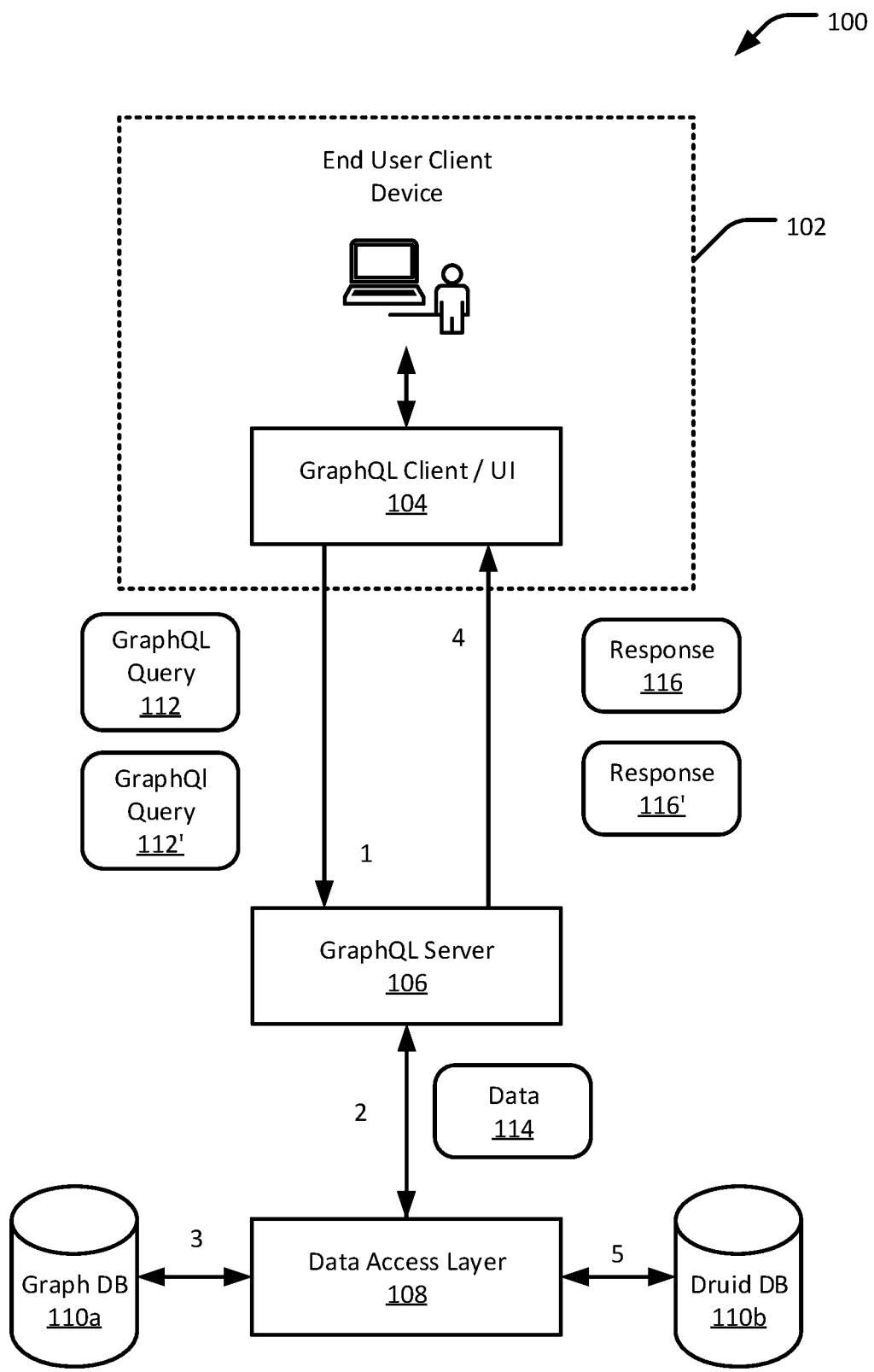
FIG. 1 is a block diagram of a data query/response process, in accordance with an example of the present disclosure.

As summarized above, at least some examples described in this disclosure are directed to techniques for executing a single database query on multiple databases. In particular, techniques are disclosed for querying data from multiple databases through a single GraphQL query from a calling device. A GraphQL schema is used to convert the single GraphQL input query into separate queries coded in query languages suitable for the type of database being queried. The responses for each query are then aggregated and returned to the calling device.

In accordance with an example of the present disclosure, a customer adds one or more products, such as a virtual application or desktop, a collaboration application or desktop, or other application to an analytical service. Data from these products flow into the analytical service. The data can represent, for example, device logins, network access, application execution, file creation and sharing, and other activities. The data are ingested into multiple databases depending on the nature of the data. For example, some types of databases are better suited for storing data relating to entity relationships while other types of databases are better suited for storing data relating to interactions and transactions between entities. Subsequently, users can query the databases via the analytical service to retrieve data of interest. However, the format of the query depends on the type of database, since different types of databases can utilize different query formats, and therefore it is not currently possible to form a single query that can be executed against multiple databases of different types. Thus, building multiple queries and then aggregating the results places an additional resource load on the client calling device. This approach is cumbersome and not scalable as it involves constructing and executing multiple GraphQL queries by the client as well as client-side data manipulation of the results obtained from multiple responses to build reports, dashboards, and so forth.

To this end, examples of the present disclosure provide techniques for converting a single input query for multiple databases into multiple separate queries and aggregating the results of each of the queries. A schema representing a structure of the input query is used to convert the input query into separate queries that each comport with the query languages of the respective databases. A query language is a specification that defines the syntax and procedure for retrieving information from a database. Different query languages exist for querying different types of databases. For example, GraphQL is a language-independent (or generic) data query language developed as an alternate to Representational State Transfer (REST) and ad-hoc webservice architectures. Currently, support for querying data from various databases such as Druid, Graph, and SQL is available through GraphQL. For example, GraphQL can be used to query a SQL database, a Graph database, a Druid database, etc. However, the capability to query data from multiple sources through a single GraphQL query is not possible using existing techniques, and therefore separate queries for each type of database are needed, such as described with respect to FIG. 1.

FIG. 1 is a block diagram of an example data query/response process 100, in accordance with an example of the present disclosure. An end user client device 102, or a calling device, executes a GraphQL client/user interface (UI) 104, which queries one or more databases via a GraphQL server 106. For example, the GraphQL server 106 is used to get, post, update, and/or delete data 114 from, to, or in one or more databases, such as a Graph database 110a and a Druid database 110b. The GraphQL server 106 can thus be used to retrieve data to build reports and dashboards. Each request by the GraphQL client/UI 104 from the calling device corresponds to an individual GraphQL query 112. The GraphQL query 112 is processed by the GraphQL server 106 via a data access layer 108 to obtain the data 114. In operation, the GraphQL query 112 is executed on the Graph database 110a and/or the Druid database 110b (or any other database) via the data access layer 108, resulting in a response 116 to the GraphQL client/UI 104 via the GraphQL server 106.

In the system 100 of FIG. 1, to fetch data from multiple datastores (such as the Graph database 110a and the Druid database 110b), a primary GraphQL query 112 is constructed and coded in a first database query language (e.g., Graph) and then executed to fetch a primary response 116 from a first database 110a. In FIG. 1, this process is represented by a path 1, 2, 3, 2, and 4. Similarly, a secondary GraphQL query 112' is constructed based on the primary response 116 obtained from the first query 112 and then coded in a second database query language (e.g., Druid) and then executed to fetch a secondary response 116' from a second database 110b. This process is represented by a path 1, 2, 5, 2, 4. The responses 116, 116' are aggregated by the client 102 as needed. However, as noted above, this approach is cumbersome and not scalable because multiple GraphQL queries must be constructed by the GraphQL client/UI 104. Furthermore, the GraphQL client/UI 104 must aggregate the responses.

To this end, embodiments of the present disclosure provide support for querying multiple databases through a single, input GraphQL query using a GraphQL schema. This is achieved by translating the input GraphQL query from a calling device into several individual database queries that are executed on the respective databases, followed by aggregating the result from these databases to provide a single response back to the calling device, such as described with respect to FIG. 2. This process shifts processing load from the client device 102 to the GraphQL server 106.

Figure 2:
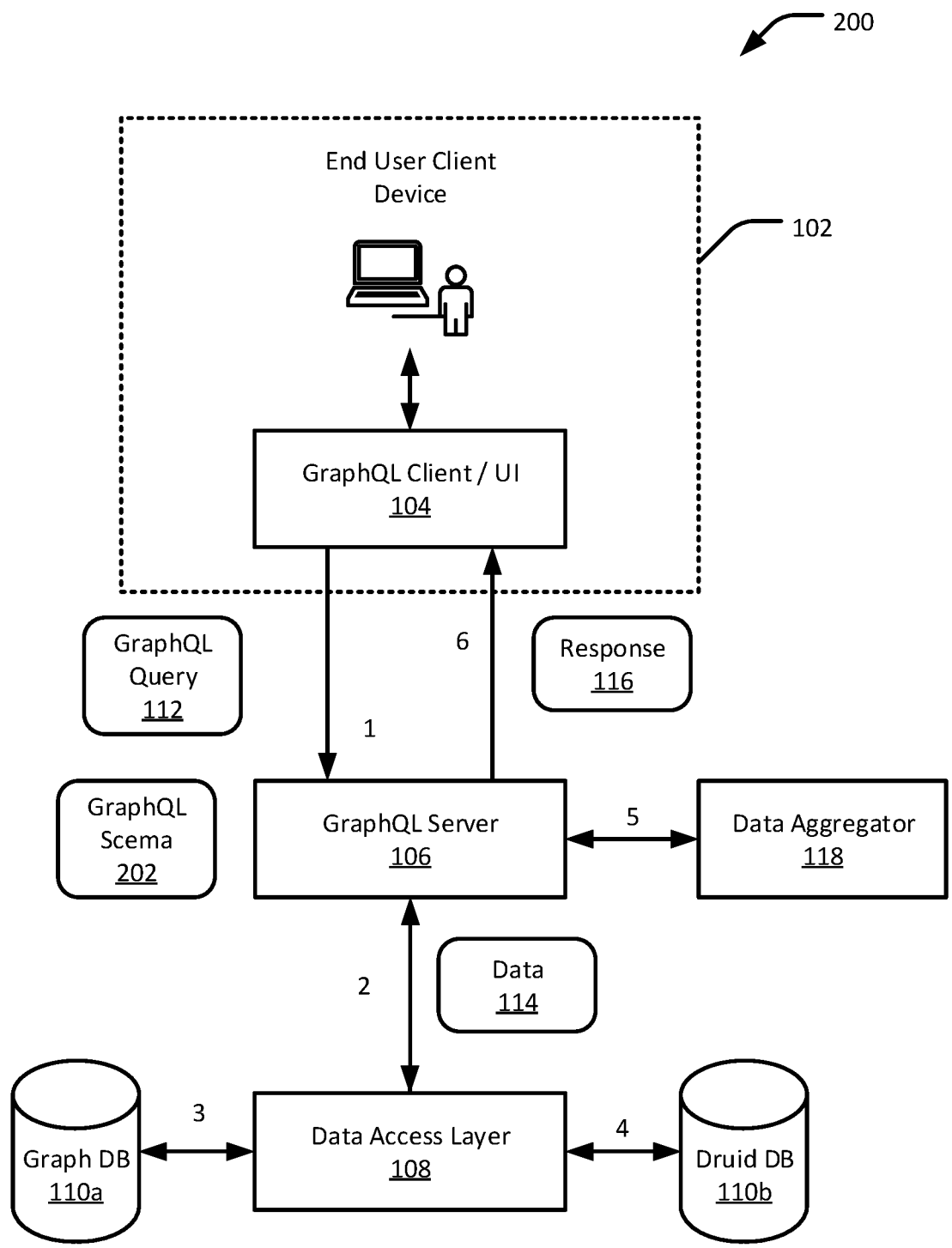
FIG. 2 is a block diagram of another data query/response process, in accordance with an example of the present disclosure.

FIG. 2 is a block diagram of another example data query/response process 200, in accordance with an example of the present disclosure. In this process 200, the end user client device provides a single, or input, GraphQL query 112 to the GraphQL server 106 to obtain the data 114 from multiple databases 110a, 110b via a data access layer 108. A GraphQL schema 202 is configured such that the response 116 is obtained from the multiple databases 110a, 110b. When the client 102 calls the GraphQL server 106, the server 106 identifies the multiple databases 110a, 110b from the query 112 and generates a first database query to be executed on the first database 110a. Based on the results of the first database query, the server 106 then generates a second database query to be executed on the second database 110b. The data 114 obtained from the first and second database queries are aggregated before sending the GraphQL response 116 to the client/UI 102. In FIG. 2, this process is represented by a path 1, 2, 3, 2, 4, 2, 5, and 6. Processes that the server 106 is configured to execute using this flow are described in further detail with respect to FIGS. 9, 10 and 11. In this manner, the client 102 now makes only one request (GraphQL query 112) to the GraphQL server 106 to fetch the data 114 from both databases 110a, 110b.

The disclosed techniques can be used by any service, including cloud-based services or local services, that leverages the data from multiple sources. The disclosed GraphQL-based querying is supported for multiple databases from any client without the need to configure multiple database endpoints, which are points of entry into a server through which the server routes all interactions with the database. In some examples, the multiple query generation and result aggregation are performed by a server, which in turn reduces the overhead on the client/UI.

Example Database Schemas

In accordance with some embodiments, as noted above, data can be stored in a variety of different types of databases depending on the nature of the data. For example, data that correlates entities in a computing environment can be stored in a Graph database, while time-sensitive activity, events, and interactions between entities can be stored in a Druid database. Other examples will be apparent in view of this disclosure. These databases can be represented by schemas that describe the structure and relationships between data. For example, a Druid schema of a "RiskIndicator" table can be represented as:

_time: String
userName: String
indicatorName: String
product: String

The "RiskIndicator" table includes data of risk indicator occurrences (e.g., "indicatorName") at the time (e.g., "_____time") for a user (e.g., "username") belonging to a product (e.g., "product"). In contrast to the Druid schema, a graph schema can be used to define the details of the user and the relationship between the user and other entities, such as discussed with respect to FIG. 3.

Figure 3:
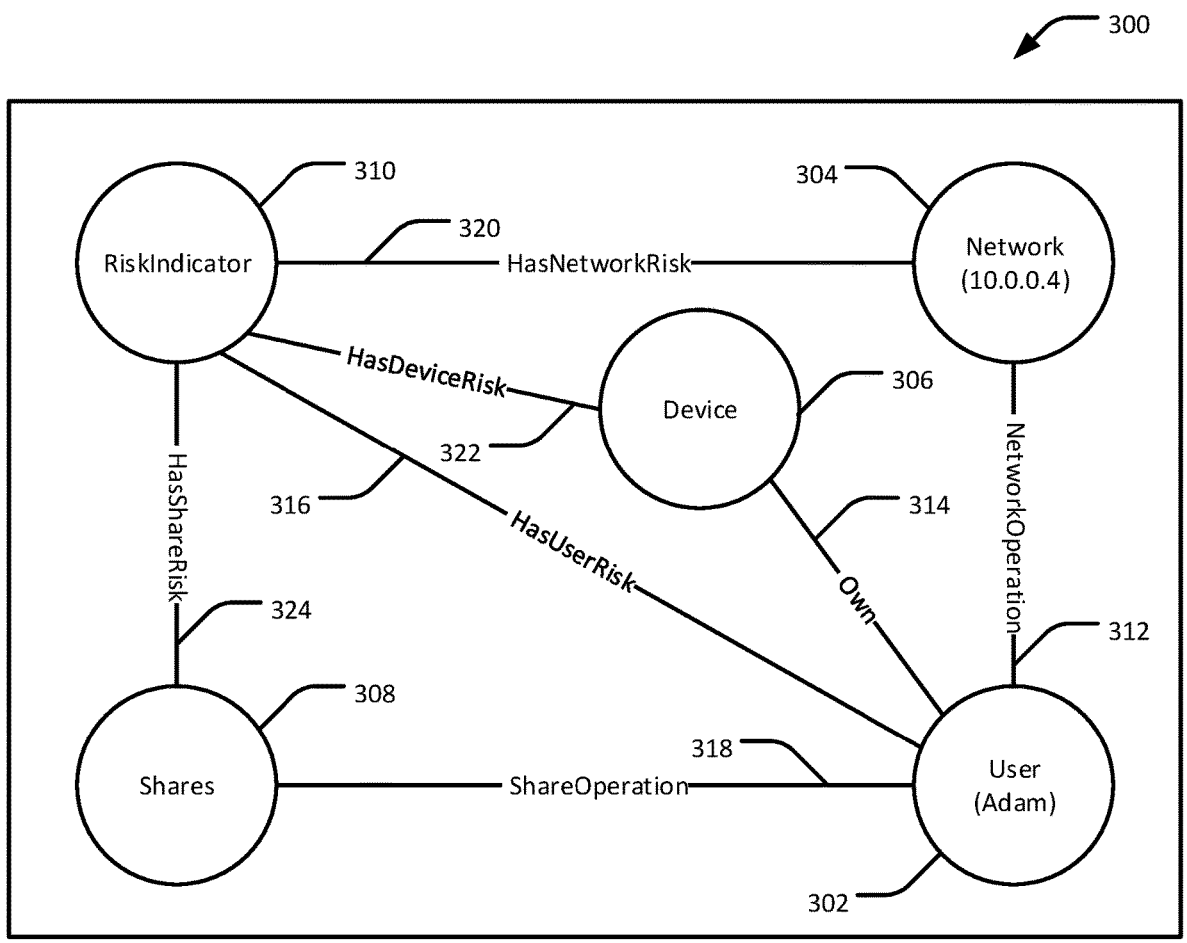
FIG. 3 is a diagram of a graph database schema that can be used in conjunction with the data query/response process of FIG. 2, in accordance with an example of the present disclosure.

FIG. 3 is a diagram of a graph database schema 300, in accordance with examples of the present disclosure. The graph database schema 300 is a representation of the structure of a graph database, such as the graph database 110a of FIGS. 1 and 2. The graph database schema 300 includes one or more vertices (e.g., 302, 304, 306, 308, 310) representing entities in a computing environment and one or more edges (e.g., 312, 314, 316, 318, 320, 322, 324) connecting the vertices together. The vertices represent entities in a computing environment, such as user computing devices, servers, network communications devices, and other representations of the computing environment such as file shares, accounts, or any other item to be tracked. The edges are the lines that connect vertices and represent the relationship between the connected vertices. Meaningful patterns can be identified by examining the connections represented by the edges. The relationships represented in the schema 300 allow data in the graph database to be linked together directly and, in some cases, retrieved with one operation. It will be understood that the graph database schema 300 described here is merely one possible example and that, in practice, the schema will reflect data that is associated with the computing environment at any given time and is subject to change dynamically as entities enter the environment and as events occur over time. Thus, the graph database schema 300 is not a static representation of the graph database but rather an instantaneous representation of the graph database at a given point in time. For example, the graph database can represent the current state of one or more users and their relationships with other entities (e.g., in FIG. 3, the user 302 has an ownership relationship 314 with a device 306). In some examples, the graph database schema 300 is updated in real time or in near-real time as entities are added to the environment or as events occur in the environment.

In this example, the graph database schema 300 includes the following entities: User 302, Network 304, Device 306, Shares 308, and RiskIndicator 310. Each of these entities is represented in the graph database schema 300 as a vertex in the graph database. The graph database schema 300 further includes the following relations between entities: NetworkOperation 312, Own 314, HasUserRisk 316, ShareOperation 318, HasNetworkRisk 320, HasDeviceRisk 322, and HasShareRisk 324. Each of these relations is represented in the graph database schema 300 as an edge between corresponding vertices in the graph database. Each of the vertices and edges in the graph database schema 300 can be associated with data relating to the entities and relations, as will be described by example below.

In an example, consider a user Adam whose account is being attacked. The user Adam is represented by the User 302 vertex in the graph database schema 300, and Adam's computing device (e.g., desktop, laptop, tablet, etc.) is represented by the Device 306 vertex. The relation Own 314 represents the relationship between the User 302 Adam and his Device 306. A hacker attempts to login to Adam's account multiple times from a network with IP 10.0.0.4 but fails to login. All login attempts made by Adam are events, which are loaded to graph database by creating User vertex "Adam" 302 and Network vertex "10.0.0.4". The relation NetworkOperation 312 between the two vertices User 302 and Network 304 is created, with the access time set to the current time.

The events are then used to predict or detect any risk using one or more machine learning (ML) or other rule-based models. In this example, the models predict an excessive authorization failures risk, which is associated with the user Adam. The risk is updated in the graph database by creating the RiskIndicator 310 vertex for excessive authorization failures and a relation HasUserRisk 316 between the User 302 and RiskIndicator 310 vertices, with the current time stamp of occurrence and any other related information. Other examples will be apparent in light of this disclosure.

FIG. 4 shows an example of a GraphQL schema configuring both the graph and druid schemas described above. In the schema of FIG. 4, "casuser" is the GraphQL resolver. A selection set is of type "CASUser" with the database defined as "graph" in the corresponding "@dataSource" annotation, or a database source annotation, indicating that data should be retrieved from the (first) graph database. The type "CASUser" has attributes "name," "email," and "riskScore" that are available in the graph database. "riskIndicators" in CASUser is a selection set of type "CASRiskIndicators" having the attributes available in the Druid database such as "time," "userName," "indicatorName," and "product," with the database defined as "Druid" in the corresponding "@dataSource" annotation. The "source:name" and "destination:username" attributes in the "@dataSource" annotation represent an aggregation key on which the data are to be aggregated after retrieval from each of the databases (e.g., the graph and Druid databases).

FIGS. 5A-E show another example of a GraphQL schema corresponding to the schema 300 of FIG. 3. In FIG. 5A, the example GraphQL schema defines a datatype (e.g., "CASUser") having a primary data source (e.g., "GRAPH") and a secondary data source (e.g., "DRUID"). In this example, the datatype includes a table named "riskIndicators" defined to include a field named "CASRiskIndicators," which is accessed via a query to the secondary data source (e.g., "DRUID"). The type definition uses a "@dataSource" annotation to define the primary and secondary data sources for the datatype. Further, the "@dataSource" annotation includes attributes "source" and "destination," which are used to map field names from the primary data source to the secondary data source. For example, in the primary data source a field named "name" in the "riskIndicators" table is mapped to a field named "userName" in the secondary data source. This mapping within the schema permits the results of queries to the primary and secondary data sources (the "first query" and the "second query," respectively) to be aggregated. For example, if the results of the first query include data from the "name" field of the primary data source, that data can be used to generate the second query using the results from the "name" field of the primary data source for retrieving data from the "username" field of the secondary database.

Figure 6:
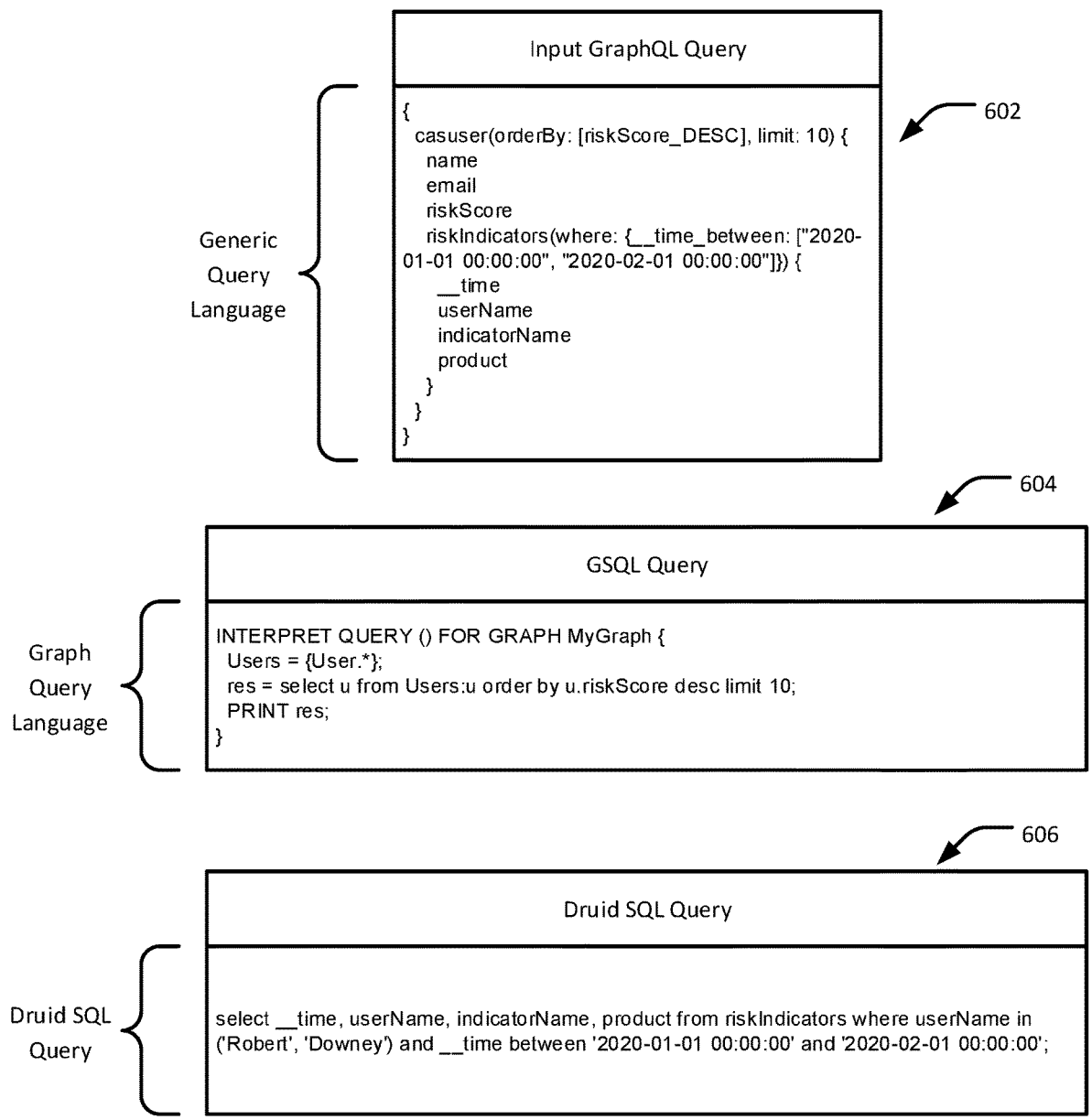
FIG. 6 shows an example of an input GraphQL query to a graph database and a Druid database, in accordance with an example of the present disclosure.

FIG. 6 shows an example of an input GraphQL query 602 to a graph database and a Druid database using the techniques disclosed herein. In Example 1 (FIG. 6), the input GraphQL query 602 is a query to get the top 10 risky users and their corresponding risk indicators for the previous month. The input GraphQL query 602 is translated into a graph query 604 and a Druid query 606. The graph query 604, or a first query, is executed first on a graph database to get the top 10 risky users. In this example, the graph query 604 resulted in the users "Robert" and "Downey." Then the Druid query 606, or a second query, is executed on the Druid database for the specified duration (e.g., 1 month) with an additional condition on username, where the list of username(s) is obtained from the result of the first (graph) query 604 (e.g., "Robert" and "Downey"). Then the results from both the (first) graph query 604 and the (second) druid query 606 are aggregated to provide a response to the client/UI in the GraphQL response format.

Figure 7:
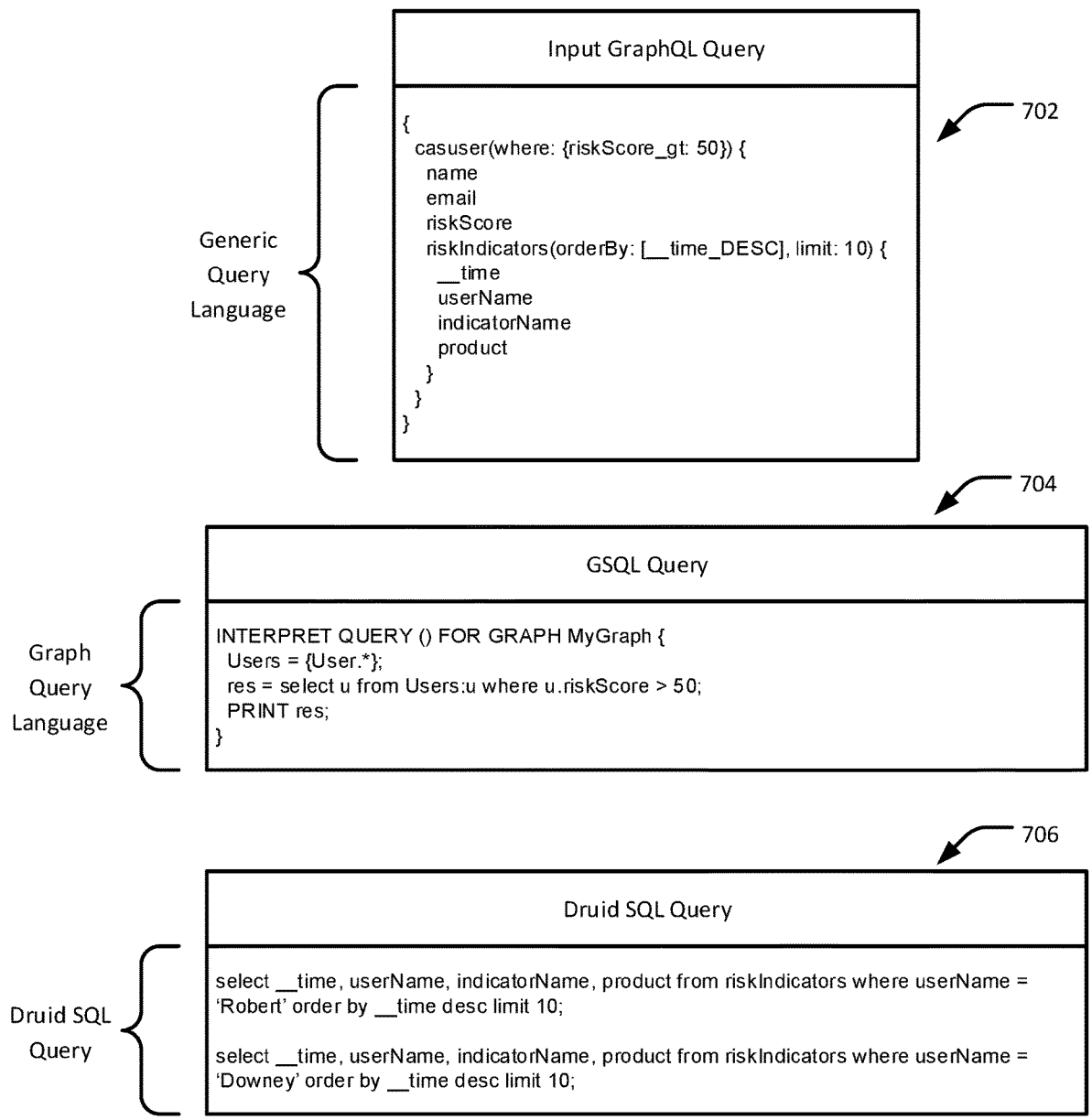
FIG. 7 shows another example of an input GraphQL query to a graph database and a Druid database, in accordance with an example of the present disclosure.

FIG. 7 shows another example of an input GraphQL query 702 to a graph database and a Druid database using the techniques disclosed herein. In Example 2 (FIG. 7), the input GraphQL query 702 is a query to get all users where the risk score is greater than 50 along with the top 10 risk indicators. The input GraphQL query 702 is translated into a graph query 704 and a Druid query 706. The graph query 704, or a first query, is executed first on a graph database to get the users with a risk score greater than 50. In this example, the graph query 704 resulted in the users "Robert" and "Downey." Then the Druid query 706, or a second query, is executed on the Druid database to get the top 10 risk indicators associated with each username, where the list of username(s) is obtained from the result of the first (graph) query 704 (e.g., "Robert" and "Downey"). Then the results from both the (first) graph query 704 and the (second) druid query 706 are aggregated to provide a response to the client/UI in the GraphQL response format.

Figure 8:
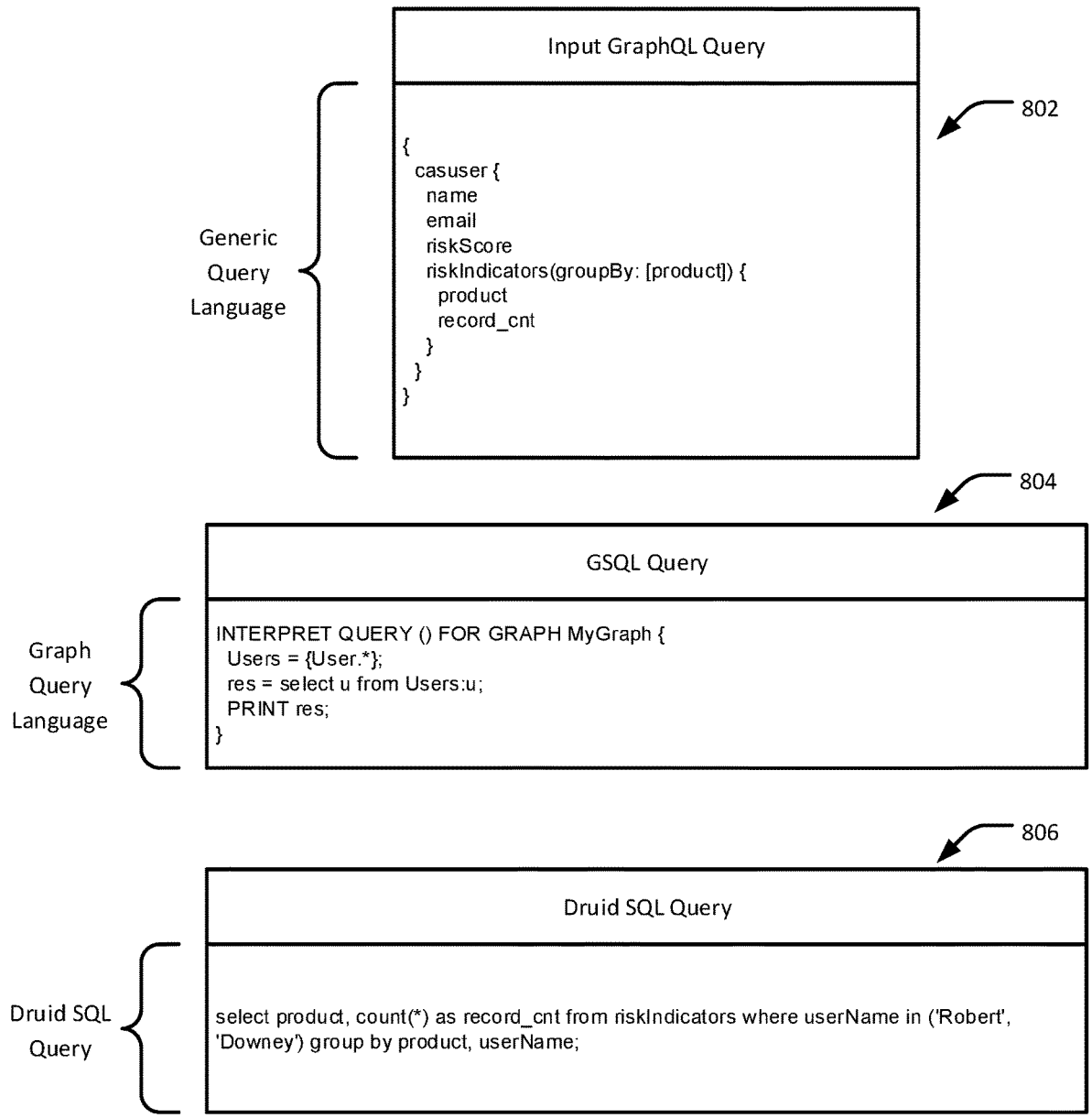
FIG. 8 shows yet another example of an input GraphQL query to a graph database and a Druid database, in accordance with an example of the present disclosure.

FIG. 8 shows yet another example of an input GraphQL query 802 to a graph database and a Druid database using the techniques disclosed herein. In Example 3 (FIG. 8), the input GraphQL query 802 is a query to get all users with a list of distinct product counts for each user from RiskIndicators. The input GraphQL query 802 is translated into a graph query 804 and a Druid query 806. The graph query 804, or a first query, is executed first on a graph database to get the users. In this example, the graph query 804 resulted in the users "Robert" and "Downey." Then the Druid query 806, or a second query, is executed on the Druid database to get the distinct products and their counts associated with each username, where the list of username(s) is obtained from the result of the first (graph) query 804 (e.g., "Robert" and "Downey"). Then the results from both the (first) graph query 804 and the (second) druid query 806 are aggregated to provide a response to the client/UI in the GraphQL response format.

The second query is generated from an inner query in the input GraphQL query; that is, a portion of the input GraphQL query that is used to query the secondary data source. Using the GraphQL schema example of FIG. 5A, if the input GraphQL query includes "riskIndicators," this portion of the input GraphQL query will be used to generate a second query to the second data source per the GraphQL schema. The following is an example algorithm for generating an inner query from the input GraphQL query, in accordance with an embodiment of the present disclosure:

--- if "limit" condition exists in the second query then:
   for each resultant set from first query:
      create the target query and add additional "where" condition on
      the <primaryId>
      union all the individual queries that are generated to obtain the results
else if "group by" condition exists in the second query then:
   create the target query and add the additional conditions:
      "where" condition with the list of <primaryIds> from the resultant
set of first response
      "group by"+condition on the <primaryId>
else:
   create the target query and add "where" condition with the list of
   <primaryIds> from the resultant set of first response

---

Example Process for Executing an Input GraphQL Query on Multiple Databases

Figure 9:
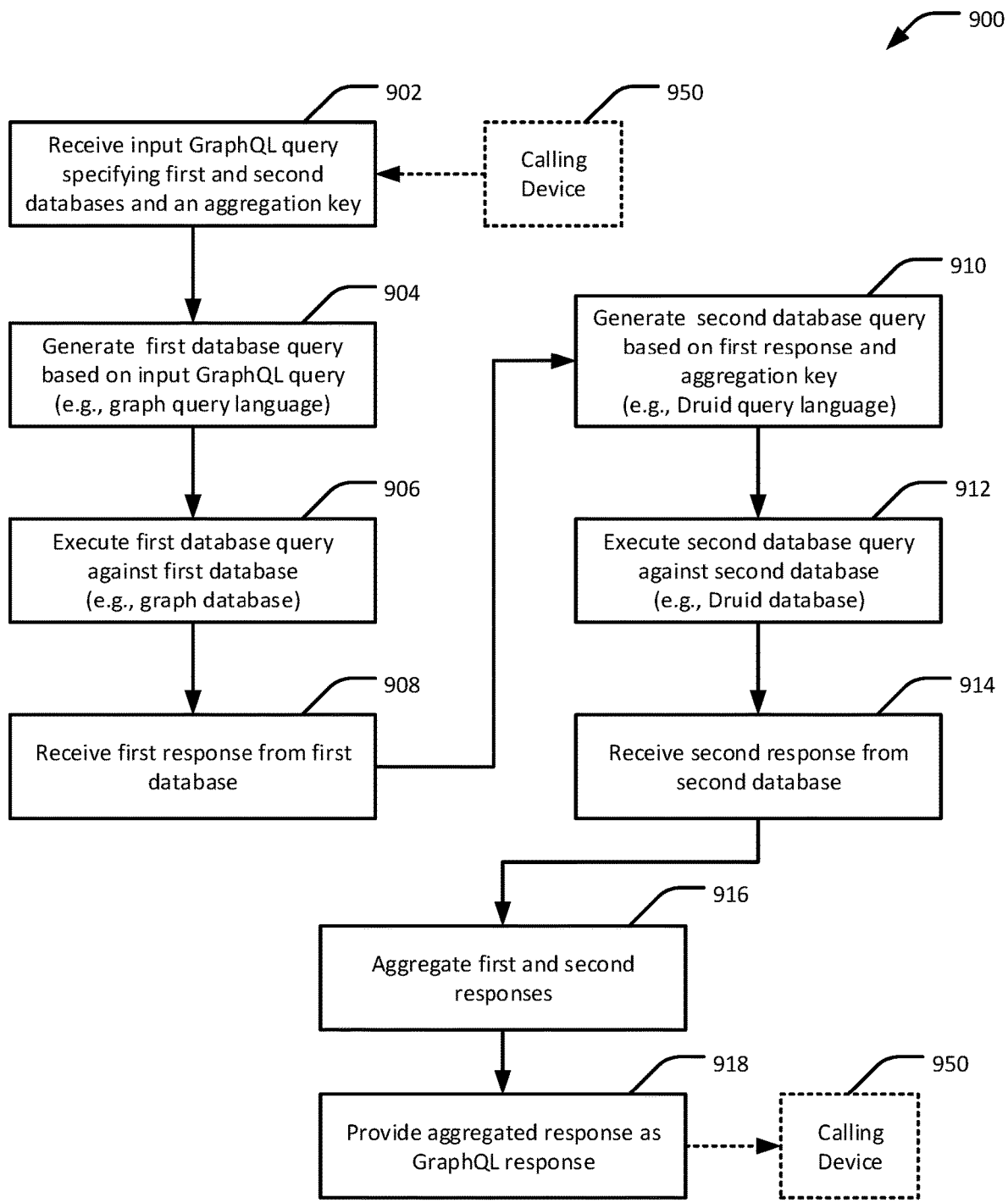
FIG. 9 is a flow diagram of an example method for executing an input GraphQL query on multiple databases, in accordance with an example of the present disclosure.

FIG. 9 is a flow diagram of an example method 900 for executing an input GraphQL query on multiple databases, in accordance with an embodiment of the present disclosure. As discussed above with respect to FIGS. 5A, 6, 7, and 8, data satisfying a given input GraphQL query can reside on multiple databases. To obtain the data, the input GraphQL query must be split into two or more separate queries, one for each of the databases from which data is to be retrieved, as described in further detail below.

The method 900 includes receiving 902 an input GraphQL query from a calling device 950 (e.g., a client computing device). The input GraphQL query specifies one or more selection sets each defining an aggregation key, at least one first field to be queried in a first database (e.g., a graph database) from which to retrieve responses to a query, and at least one second field to be queried in a second database (e.g., a Druid database) from which to retrieve responses to the query. The aggregation key specifies a mapping between at least one first field in the first database and at least one second field in the second database (for example, a mapping between fields in each of the databases that are used to store the same or similar data, such as a username.) It will be understood that the first database and the second database can each be any type of database, and that the first database and the second database can be the same type of database or different types of databases. The first (primary) database is determined from the GraphQL schema resolver based on the "@dataSource" annotation, such as discussed with respect to FIG. 5A. Then the query is generated for the targeted database based on the datastore type in the schema selected. The method 900 further includes generating 904 a first database query (e.g., a query coded in graph query language) to retrieve at least one first field from a first database (e.g., a graph database) based on the input GraphQL query, such as described below with respect to FIG. 10. The first database query is then executed 906 or caused to be executed against the first database. The method 900 further includes receiving 908 a first response from the first database.

The method 900 further includes generating 910 a second database query (e.g., a query coded in Druid query language) to retrieve at least one second field from a second database (e.g., a Druid database) based on the first response and the aggregation key, such as described below with respect to FIG. 11. The second database query is then executed 919 or caused to be executed against the second database. The method 900 further includes receiving 914 a second response from the second database.

The method 900 further includes aggregating 916 the first response and the second response. The aggregation can be achieved by combining unique data fields from each of the responses to avoid duplications. The method 900 further includes providing 918 the aggregated response as a GraphQL response to the calling device 950 (e.g., the client computing device).

In accordance with some embodiments, the input GraphQL query includes a selection set of database fields to be queried. In some cases, the input GraphQL query further includes one or more query conditions, such as a where condition, a group by condition, an order by condition, and/or a limit condition, which can be used to narrow the results in a precise manner.

Figure 10:
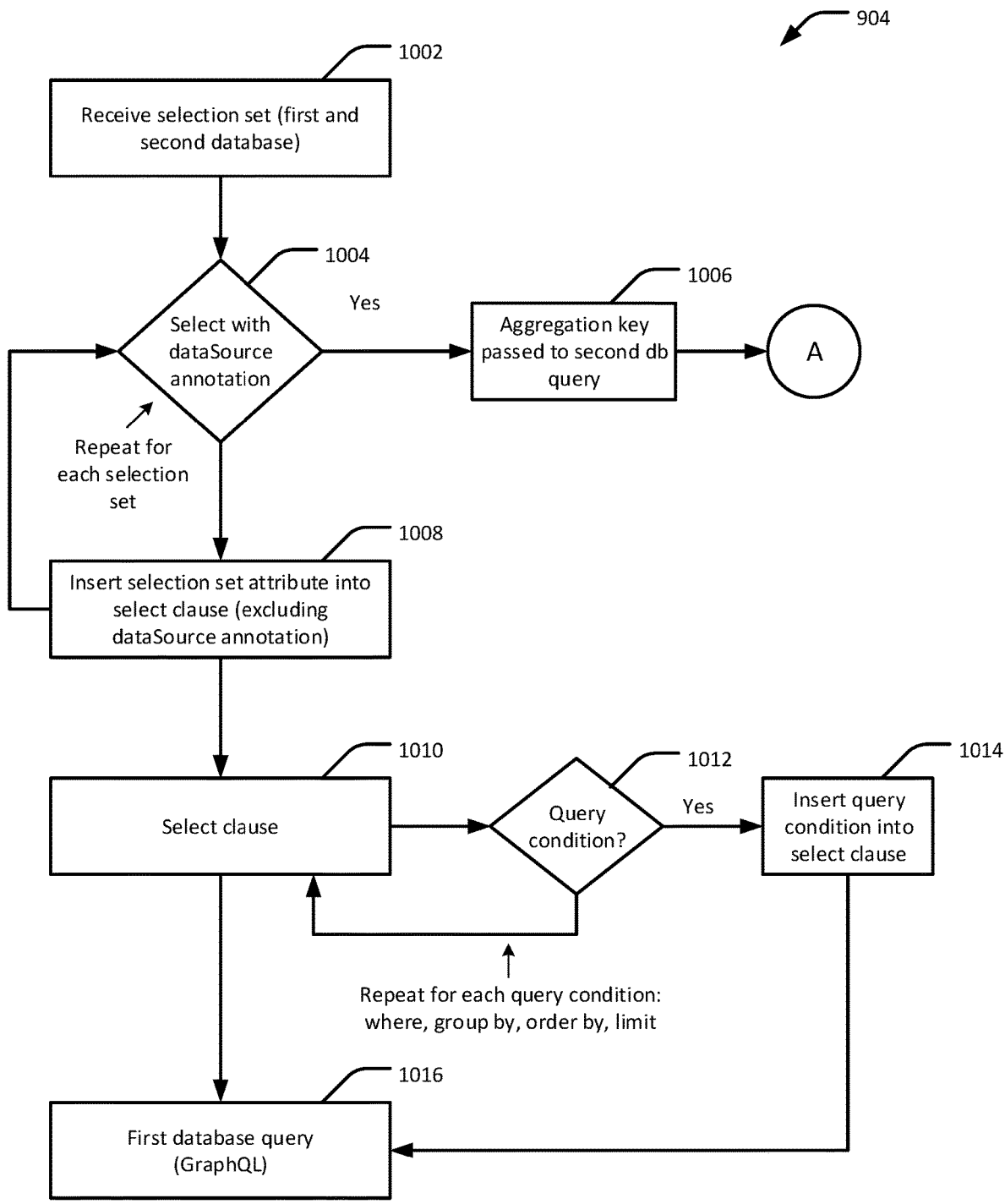
FIG. 10 is a flow diagram of an example process for generating a first database query for the input GraphQL of FIG. 9, in accordance with an example of the present disclosure.

FIG. 10 is a flow diagram of an example process for generating 904 the first database query, in accordance with an embodiment of the present disclosure. The query generation begins by receiving one or more selection sets 1002 from the input GraphQL query. The selection sets 1002 represent the search conditions for retrieving data from the respective (first and second) databases. The first database is determined from the GraphQL schema resolver based on the "@dataSource" annotation on the selection set 1002. The first database query is generated for the database based on the datastore type in the schema. Likewise, the second database is determined from the GraphQL schema resolver based on the "@dataSource" annotation on the selection set 1002. Each selection set is checked 1004 for whether it has a "@dataSource" relation annotation in the GraphQL schema. The "@dataSource" annotation "destination" attribute includes an aggregation key that defines a field in the second database that corresponds to (is mapped to) a field in the first database. For example, if the "source" attribute in the "@dataSource" annotation is "name" and the "destination" attribute in the "@dataSource" annotation is "username," then the "name" field in the first database corresponds to the "username" field in the second database. The aggregation key and a portion of the results from the first database query of the first database that correspond to the aggregation key are passed to the second database query generator, as will be described in further detail with respect to FIG. 11. Thus, if the current selection set attribute has a "@dataSource" annotation in a select field, the aggregation key is passed 1006 passed on to the second database query generator. The check 1004 is repeated for all attributes in the selection set. Each selection set attribute, excluding the attribute with the "@dataSource" annotation, is inserted 1008 into a select clause 1010 of the first database query 1016, as described below.

The generating of the first database query 904 includes determining 1012, based on the selection set 1002, whether a query condition exists on the selection clause 1010. Examples of query conditions include but are not limited to a where clause, a group by clause, an order by clause, and/or a limit clause. A "where clause" is, for example, a clause in the first database query that defines a parameter that is to be matched in the database. For example, the query "get all users where the risk score is greater than 50" can be constructed as a graph query that includes results from the graph database where the risk score is ">50." The "where clause" can also exclude results, such as by requesting all results where the result does not include the parameter defined in the query (e.g., result all results where the risk score is not ">50"). An "order by clause" is, for example, a clause in the first database query that causes the results of the query to be returned in a particular order or sequence. For example, the query "get all users where the risk score is in the top 10" can include an "order by name" clause so that the results are returned sorted according to the risk score in descending order. A "limit clause" is, for example, a clause in the first database query that defines a constraint on the number of unique results returned by the query. For example, the query "get all users where the risk score is greater than 50" can include a "limit by 10" to limit the number of results returned by the query to 10 or fewer.

The where condition, if it exists in the select clause 1010 as part of the input GraphQL query, is inserted 1014 into the select clause 1010 of the first database query 1016. Likewise, the group by condition, if it exists in the select clause 1010 as part of the input GraphQL query, is inserted 1014 into the select clause 1010 of the first database query 1016. Similarly, the order by condition, if it exists in the select clause 1010 as part of the input GraphQL query, is inserted 1014 into the select clause 1010 of the first database query 1016. Finally, the limit condition, if it exists in the select clause 1010 as part of the input GraphQL query, is inserted 1014 into the select clause 1010 of the first database query 1016. The first database query, after execution on the first database, yields the first response, which is passed onto the second database query generator for further processing such as described with respect to FIG. 11.

Figure 11:
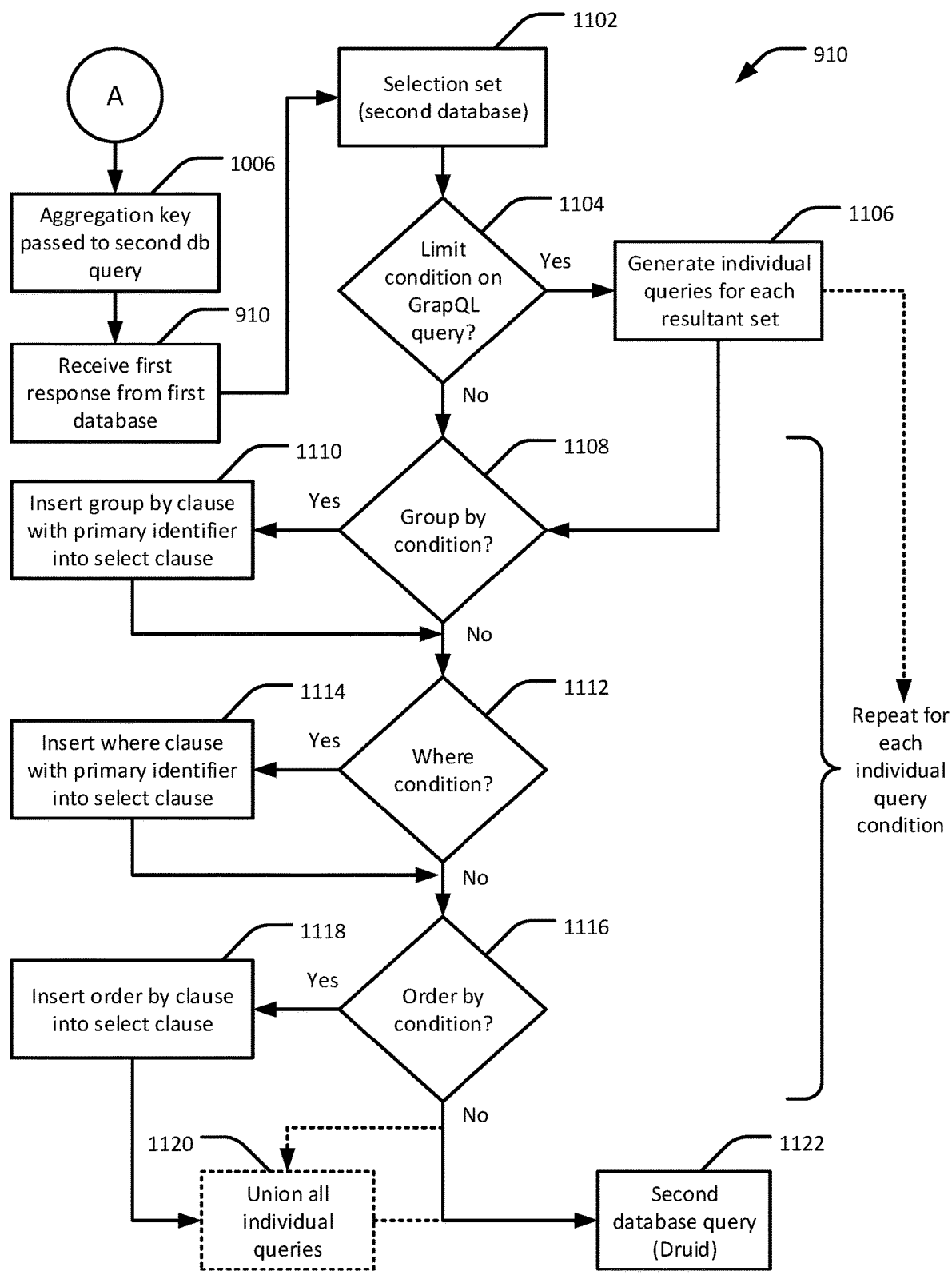
FIG. 11 is a flow diagram of an example process for generating a second database query for the input GraphQL of FIG. 9, in accordance with an example of the present disclosure.

FIG. 11 is a flow diagram of an example process for generating 910 the second database query, in accordance with an embodiment of the present disclosure. As noted with respect to the generating 904 of the first database query, the aggregation key and the response 910 from the first database query of the first database that correspond to the aggregation key are passed 1006 to the second database query generator. The response 910 from the first database query of the first database and the selection set attribute with the "@dataSource" annotation together as part of the select clause 1102. As noted above, the second database is determined from the GraphQL schema resolver based on the "@dataSource" annotation on the selection set 1102. The query is generated for the targeted database based on the datastore type defined in the schema.

The generating of the second database query 910 checking 1104 for a limit condition on the input GraphQL query. If there is a limit condition present, then individual queries are generated 1106 for each of the resultant set from the response 910 from the first database query of the first database according to the limit condition. For example, the query "get all users where the risk score is greater than 50" can include a "limit by 10" to limit the number of results returned by the query to 10 or fewer. Otherwise, the process 910 proceeds to check 1108 the selection set 1102 for a group by condition. The group by condition, if it exists in the selection set 1102 as part of the input GraphQL query, is inserted 1110 into the select clause of the second database query 1122 as a group by condition based on the aggregation key. The aggregation key is defined in the "@dataSource" annotation destination attribute. The where condition 1112, if it exists in the selection set 1102 as part of the input GraphQL query, is inserted 1114 into the select clause of the second database query 1122 as a where condition on the aggregation key. Similarly, the order by condition 1116, if it exists in the selection set 1102 as part of the input GraphQL query, is inserted 1118 into the select clause of the second database query 1122 as an order by condition.

As noted above, if a limit condition exists in the query, the group by, where, and order by conditions are evaluated for each result in the first response corresponding to the aggregation key. For example, if the aggregation key represents a username, and if the first response includes two usernames "Robert" and "Downey," then the group by, where, and order by conditions are evaluated for each username in the first response (e.g., "Robert" and "Downey"). A union 1120 of each of the individual queries is performed to produce the second database query 1122. The union may include, for example, a combination of all of the individual queries or at least a combination of all unique individual queries (such that non-unique queries are not repeated). The second database query 1122, after execution on the second database, yields the second response, which is aggregated with the first response and returned to the calling device 950 in the GraphQL response format, as discussed with respect to FIG. 9.

Example Computing Platform

Figure 12:
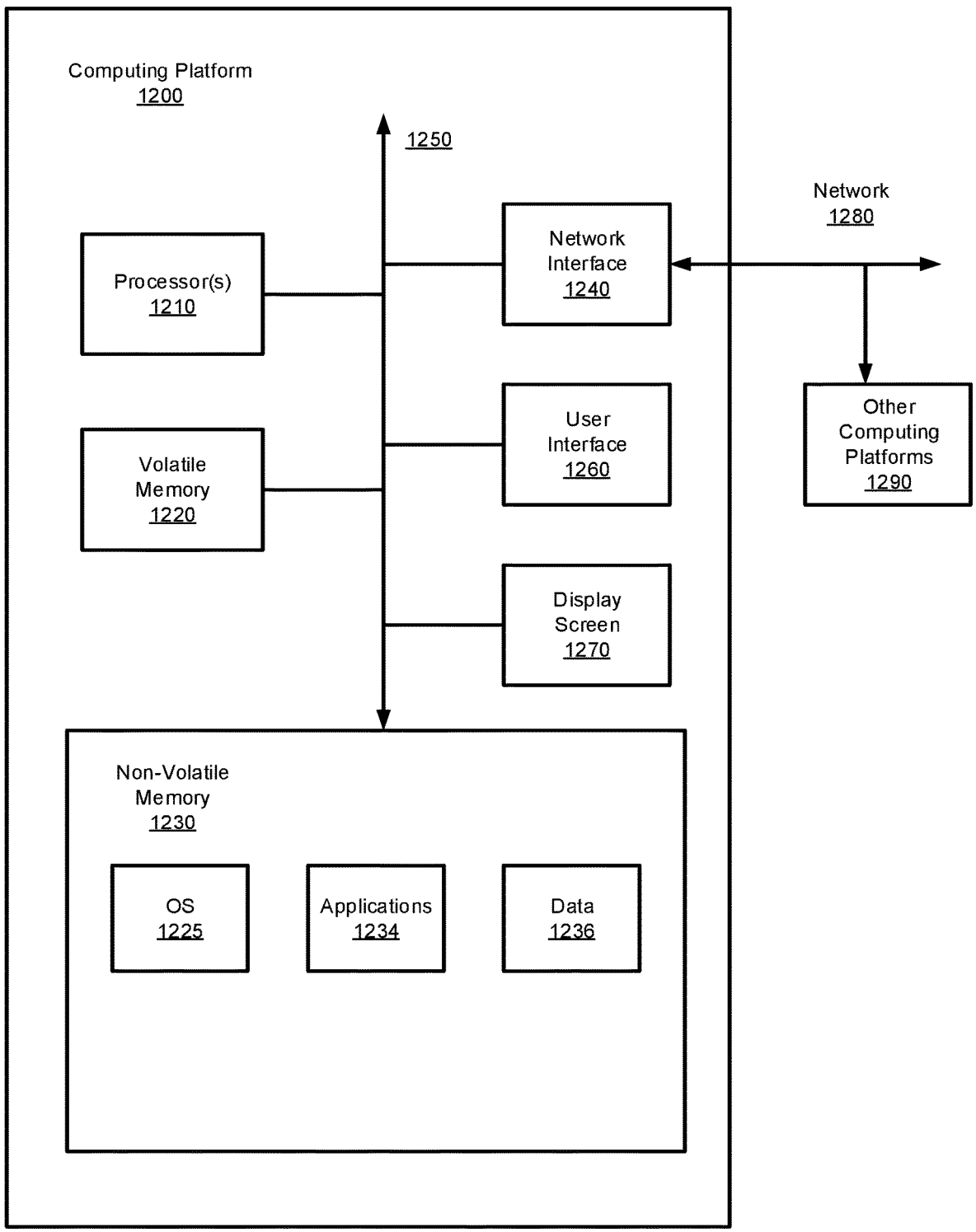
FIG. 12 is a block diagram of a computing platform configured to perform the techniques disclosed herein, in accordance with an example of the present disclosure.

FIG. 12 is a block diagram of a computing platform 1200 configured to perform the techniques disclosed herein, in accordance with an example of the present disclosure. In some cases, the platform 12 may be a workstation, a laptop computer, a server, a tablet, a mobile device, or any suitable computing or communication device. The computing platform or device 1200 includes one or more processors 1210, volatile memory 1220 (e.g., random access memory (RAM)), non-volatile memory 1230, one or more network or communication interfaces 1240, a user interface (UI) 1260, a display screen 1270, and a communications bus 1250. The computing platform 1200 may also be referred to as a computer or a computer system.

The non-volatile, non-transitory memory 1230 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1260 can include one or more input/output (I/O) devices (e.g., a mouse, a keyboard, a microphone, one or more speakers, one or more biometric scanners, one or more environmental sensors, and one or more accelerometers, etc.).

The display screen 1270 can provide a graphical user interface (GUI) and in some cases, may be a touchscreen or any other suitable display device.

The non-volatile memory 1230 stores an operating system (OS) 1225, one or more applications 1234, and data 1236 such that, for example, computer instructions of the operating system 1225 and the applications 1234, are executed by processor(s) 1210 out of the volatile memory 1220. In some examples, the volatile memory 1220 can include one or more types of RAM and/or a cache memory that can offer a faster response time than a main memory. Data can be entered through the user interface 1260. Various elements of the computer platform 1200 can communicate via the communications bus 1250.

The illustrated computing platform 1200 is shown merely as an example computing device and can be implemented by any computing or processing environment with any type of machine or set of machines that can have suitable hardware and/or software capable of operating as described herein. For example, the computing platform 1200 can be part of a cloud server system or service.

The processor(s) 1210 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1210 can be analog, digital, or mixed. In some examples, the processor 1210 can be one or more physical processors, which may be remotely located or local. A processor including multiple processor cores and/or multiple processors can provide functionality for parallel, simultaneous execution of instructions or for parallel, simultaneous execution of one instruction on more than one piece of data.

The network interfaces 1240 can include one or more interfaces to enable the computing platform 1200 to access a computer network 1280 such as a Local Area Network (LAN), a Wide Area Network (WAN), a Personal Area Network (PAN), or the Internet through a variety of wired and/or wireless connections, including cellular connections. In some examples, the network 1280 may allow for communication with other computing platforms 1290, to enable distributed computing. In some examples, the network 1280 may allow for communication with the one or more of the end user client device 102, the GraphQL server 106, the data access layer 108, the graph database 110*a*, the druid database 110*b*, the GraphQL client/UI 104, and/or the data aggregator 118 of FIG. 2.

As will be appreciated in light of this disclosure, the various modules and components of the system, as shown in FIG. 12, can be implemented in software, such as a set of instructions (e.g., HTML, XML, C, C++, object-oriented C, JavaScript, Java, BASIC, etc.) encoded on any non-transitory computer readable medium or non-transitory computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1200, can be integrated into, for example, one or more desktop or laptop computers, workstations, tablets, servers, smart phones, or other such computing devices. Other componentry and modules typical of a computing system, such as, for example a co-processor, a processing core, a graphics processing unit, a touch pad, a touch screen, etc., are not shown but will be apparent.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method comprising:
  receiving, from a calling device, an input database query including a selection set defining an aggregation key, at least one first field to be queried in a first database, and at least one second field to be queried in a second database, the aggregation key specifying a mapping between the at least one first field and the at least one second field;
  generating a first database query representing a first request to retrieve the at least one first field from the first database;

causing the first database query to be executed against the first database to obtain a first response to the first database query from the first database;

generating a second database query representing a second request to retrieve the at least one second field from the second database, the second request based on the aggregation key and the first response to the first database query from the first database;

causing the second database query to be executed against the second database to obtain a second response to the second database query from the second database;

aggregating the first response and the second response to the second database query from the first database to produce an aggregated response; and providing the aggregated response to the calling device.

2. The method of claim 1, further comprising coding the first database query in a first database query language, and coding the second database query in a second database query language.

3. The method of claim 1, wherein the input database query includes a database source annotation defining the first database, the second database, and the aggregation key, and wherein generating the second database query includes inserting a portion of the first response that corresponds to the aggregation key into the second database query.

4. The method of claim 1, wherein the input database query includes a limit condition, and wherein the method further comprises generating a plurality of individual queries based on the first response from the first database according to the limit condition.

5. The method of claim 4, further comprising performing a union of each of the individual queries to produce the second database query.

6. The method of claim 1, wherein the input database query is a GraphQL query, wherein the first database query is a graphs query, wherein the second database query is a Druid query, and wherein the aggregated response is a GraphQL response.

7. A computer program product including one or more non-transitory machine-readable mediums having instructions encoded thereon that when executed by at least one processor cause a process to be carried out, the process comprising:

receiving, from a calling device, an input database query including a selection set defining an aggregation key, at least one first field to be queried in a first database, and at least one second field to be queried in a second database, the aggregation key specifying a mapping between the at least one first field and the at least one second field;

generating a first database query representing a first request to retrieve the at least one first field from the first database;

causing the first database query to be executed against the first database;

generating a second database query representing a second request to retrieve the at least one second field from the second database, the second request based on the aggregation key and the first response to the first database query from the first database;

causing the second database query to be executed against the second database;

aggregating the first response and the second response to the second database query from the first database to produce an aggregated response; and providing the aggregated response to the calling device.

8. The computer program product of claim 7, wherein the process further comprises coding the first database query in a first database query language, and coding the second database query in a second database query language.

9. The computer program product of claim 7, wherein the input database query includes a database source annotation defining the first database, the second database, and the aggregation key, and wherein generating the second database query includes inserting a portion of the first response that corresponds to the aggregation key into the second database query.

10. The computer program product of claim 7, wherein the input database query includes a limit condition, and wherein the process further comprises generating a plurality of individual queries based on the first response from the first database according to the limit condition.

11. The computer program product of claim 10, wherein the process further comprises performing a union of each of the individual queries to produce the second database query.

12. The computer program product of claim 7, wherein the input database query is a GraphQL query, wherein the first database query is a graphs query, wherein the second database query is a Druid query, and wherein the aggregated response is a GraphQL response.

13. A system comprising:

a storage; and at least one processor operatively coupled to the storage, the at least one processor configured to execute instructions stored in the storage that when executed cause the at least one processor to carry out a process including receiving, from a calling device, an input database query including a selection set defining an aggregation key, at least one first field to be queried in a first database, and at least one second field to be queried in a second database, the aggregation key specifying a mapping between the at least one first field and the at least one second field;

generating a first database query representing a first request to retrieve the at least one first field from the first database;

causing the first database query to be executed against the first database;

generating a second database query representing a second request to retrieve the at least one second field from the second database, the second request based on the aggregation key and the first response to the first database query from the first database;

causing the second database query to be executed against the second database;

aggregating the first response and the second response to the second database query from the first database to produce an aggregated response; and providing the aggregated response to the calling device.

14. The system of claim 13, wherein the process further comprises coding the first database query in a first database query language, and coding the second database query in a second database query language.

15. The system of claim 13, wherein the input database query includes a database source annotation defining the first database, the second database, and the aggregation key, and wherein generating the second database query includes inserting a portion of the first response that corresponds to the aggregation key into the second database query.

16. The system of claim 13, wherein the input database query includes a limit condition, and wherein the process further comprises generating a plurality of individual queries based on the first response from the first database according to the limit condition, and performing a union of each of the individual queries to produce the second database query.

17. The system of claim 13, wherein the input database query is a GraphQL query, wherein the first database query is a graphs query, wherein the second database query is a Druid query, and wherein the aggregated response is a GraphQL response.

* * * * *